United States Patent [19]
Southwell

[11] 3,994,599
[45] Nov. 30, 1976

[54] METHOD AND APPARATUS FOR MEASURING WALL THICKNESS AND CONCENTRICITY OF TUBULAR GLASS ARTICLES

[75] Inventor: William H. Southwell, Yorba Linda, Calif.

[73] Assignee: Owens-Illinois, Inc., Toledo, Ohio

[22] Filed: Jan. 23, 1974

[21] Appl. No.: 435,693

[52] U.S. Cl. .............................. 356/108; 356/161
[51] Int. Cl.² .......................................... G01B 9/02
[58] Field of Search ............... 356/106 R, 108, 156, 356/161

[56] References Cited
UNITED STATES PATENTS

| | | | |
|---|---|---|---|
| 2,518,647 | 8/1950 | Teeple et al. | 356/108 |
| 3,720,471 | 3/1973 | Kasahara et al. | 356/108 |

OTHER PUBLICATIONS

Brown, D. C. and Rome, T. L., "A Simple Demonstration of the Interference and Coherence of Light," American Journal of Physics, vol. 40 (1972) pp. 470–471.

Primary Examiner—John K. Corbin
Assistant Examiner—R. A. Rosenberger
Attorney, Agent, or Firm—Charles S. Lynch; E. J. Holler

[57] ABSTRACT

A method of measuring wall thickness of a tubular glass article which comprises directing a beam of coherent light against the outer surface of the article at an angle such as to cause reflection of a portion of the beam from the outer surface and refraction of another portion of the beam by the outer surface to the inner surface which is then reflected from the inner surface and refraction out of the outer surface. The reflected rays pass outwardly from the article to a distance such as the rays converge and form interference fringes, the spacing of which is related to wall thickness. The spacing between said interference fringes is compared with a predetermined standard and a reject signal is created when the fringe spacing deviates from the predetermined standard by a predetermined amount. The method includes the step of directing additional beams of coherent light against circumferentially spaced points such that the additional beams are reflected from the outer and inner surfaces of the tubular article. The interference fringe spacing of these interference fringes are compared to one another. When the interference fringes from the several beams deviate from one another, there is a lack of concentricity between the outer and inner surfaces of the tubular article.

4 Claims, 7 Drawing Figures

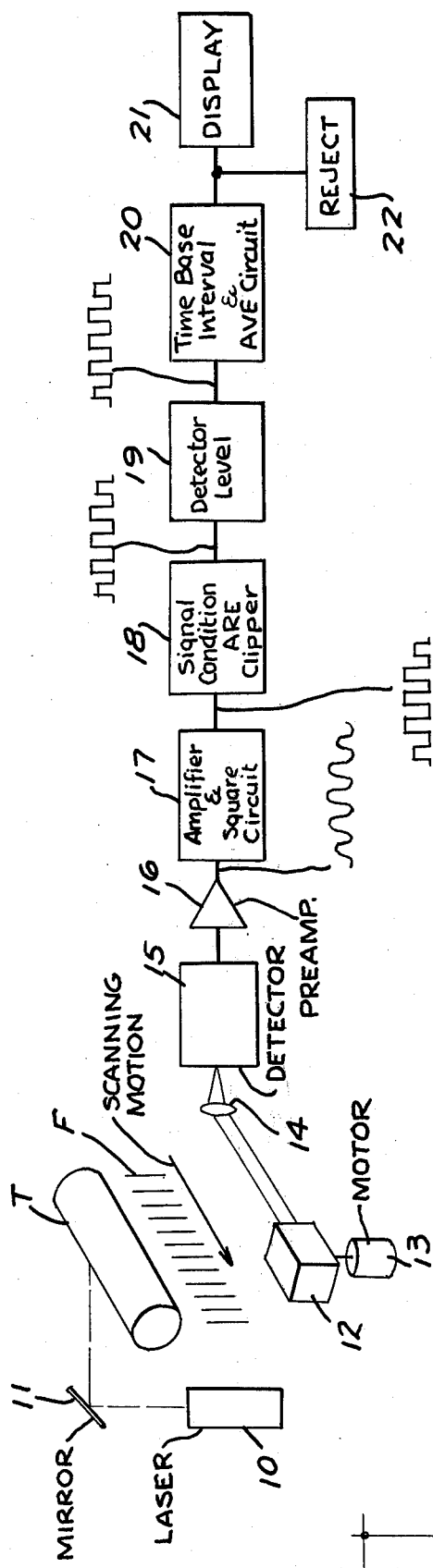
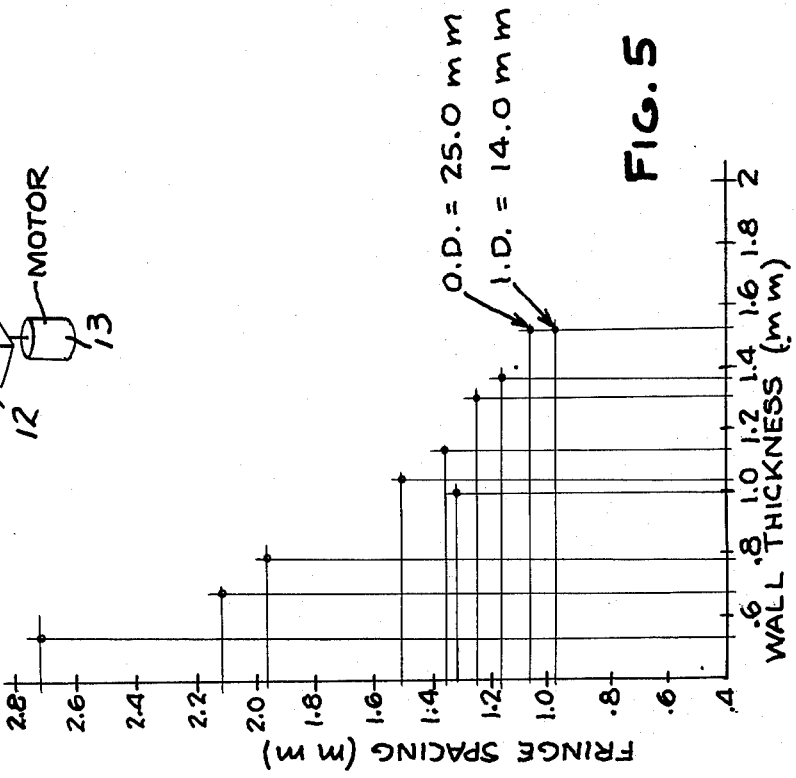
FIG. 6
FIG. 5

METHOD AND APPARATUS FOR MEASURING WALL THICKNESS AND CONCENTRICITY OF TUBULAR GLASS ARTICLES

This invention relates to measuring wall thickness and determining concentricity between the outer and inner surfaces of tubular glass articles.

BACKGROUND OF THE INVENTION

Among the objects of the invention are to provide a method and apparatus for measuring wall thickness and concentricity of tubular glass articles such as glass tubing or glass containers without contacting the glass article.

SUMMARY OF THE INVENTION

In accordance with the method and apparatus, a beam of coherent light is directed against the outer surface of the tubular article and portions of the beam are reflected by the outer and inner surfaces. When the portions converge, they form interference fringes and the spacing between the fringes corresponds to the thickness of the wall of the tubular glass article.

In order to determine concentricity, additional coherent beams are directed at circumferentially spaced points and the interference fringes thereby formed are compared to one another, and when they deviate from one another, a lack of concentricity is indicated.

DESCRIPTION OF THE DRAWINGS

FIG. 5 is a graph of fringe spacing versus wall thickness.

FIG. 6 is a schematic diagram of an apparatus embodying the invention.

DESCRIPTION

The invention is based upon the discovery that when a beam of coherent light is directed against the wall of a tubular glass article, portions of the beam are reflected by the inner and outer surfaces; these portions converge at a point spaced remotely from the article, and the spacing is related to the thickness.

Further, in accordance with the invention, when a plurality of beams are directed at circumferentially spaced points to produce interference fringes, when the fringe spacing varies at these points, it is an indication that the article lacks concentricity between the outer and inner surfaces.

Any deviations from a standard can be used to produce a reject signal.

Recently, D. C. Brown and T. L. Rome reported in the American Journal of Physics, Vol. 40, p. 470 (1972) observing interference fringes from a coherent beam such as a laser beam incident on a small glass tube. They explained the effect as being due to multiple reflections from the two glass surfaces of rays from various parts of the incident beam.

I have determined that the prominent fringe pattern is caused by the interference at the screen of only two rays: the ray reflected from the outer surface of the tube and the ray reflected from the adjacent inner surface. This is confirmed by the following analysis.

Figure 1:
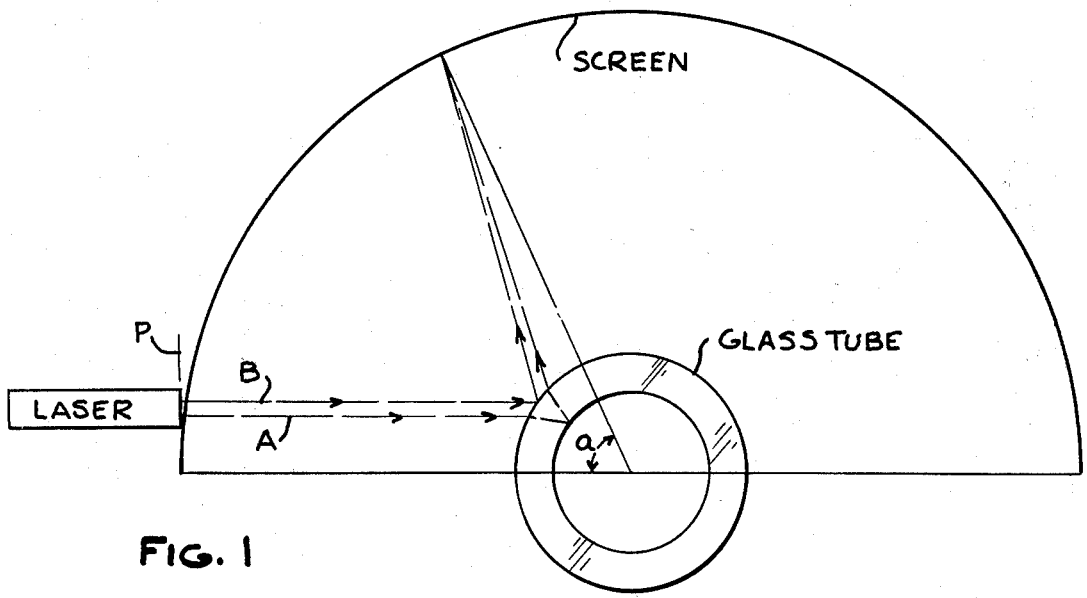
FIG. 1 is a diagrammatic view of an apparatus for performing the method.
Figure 2:
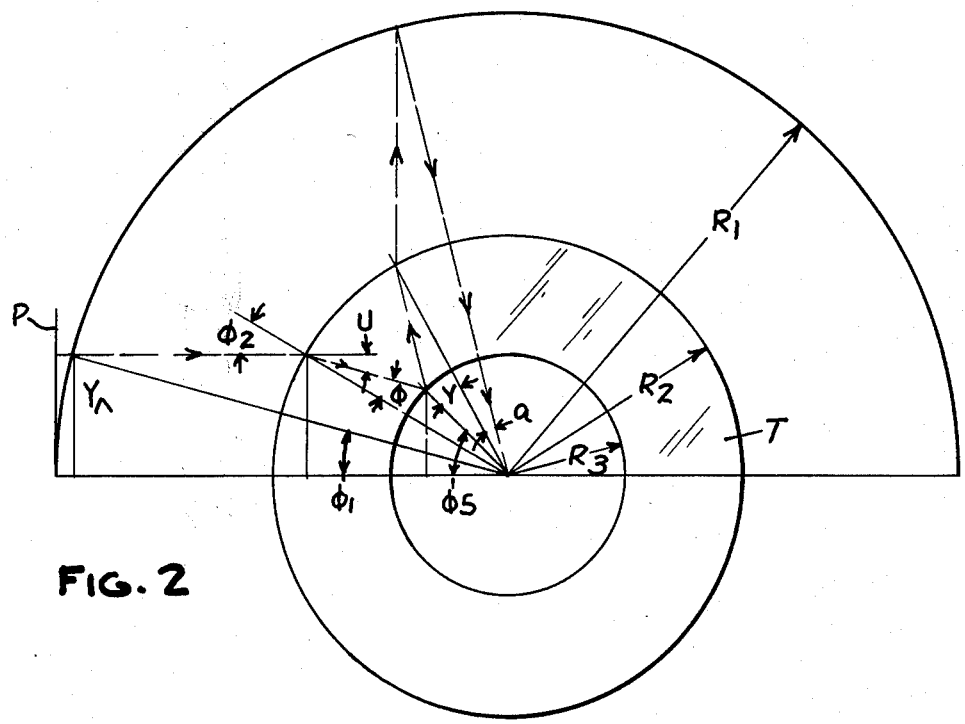
FIG. 2 is a view similar to FIG. 1 showing a portion of the rays.

Consider the two rays A and B that meet on the screen in FIG. 1. The angle $\alpha$ is used to measure the screen position as it is in FIG. 1. Consider ray A beginning with height $y_A$ in the plane P where all the rays are in phase. Notice the symmetry about the normal to the inner surface as shown in FIG. 2 due to the reflection of ray A and the fact that all surfaces are concentric. The ray is refracted at the outer surface according to Snell's law $$\sin \phi_2 = n \sin \phi \tag{1}$$

where $n$ is the index of refraction of the glass. From FIG. 1, we also have $$\sin \phi_2 = y_A/R \tag{2}$$

To trace the ray onto the inner surface, we note that the angle $u$ may be written in terms of the new height $y$ on the inner surface.

$$u = \phi_2 - \phi \tag{3}$$

$$\tan u = \frac{y_A - y}{R_2 - S_2 - R_3 + S_3} \tag{4}$$

where the sags $S_2$ and $S_3$ are given by $$S_2 = R_2 - \sqrt{R_2^2 - y_A^2} \tag{5}$$

$$S_3 = R_3 - \sqrt{R_3^2 - y^2} \tag{6}$$

thus, $$\tan u = \frac{y_A - y}{\sqrt{R_2^2 - y_A^2} - \sqrt{R_3^2 - y^2}} \tag{7}$$

Using Equations (1), (2), and (3), we evaluate $u$ and then find the $\tan u$. Equation (7) is then solved for the height $y$. This gives $$y = \cos^2 u [B + \sqrt{B^2 - (B^2 - R_3^2 \tan^2 u/\cos^2 u)}] \tag{8}$$

where $$B = y_A - \tan u \sqrt{R_2^2 - y_A^2} \tag{9}$$

Equation (7) is a quadratic in $y$ giving two solutions. We choose the larger solution since the other one gives the height where the ray would intersect the back side of the inner surface if projected through at the angle $u$.

The ray is traced up to the inner surface now. However, due to symmetry, this is all we need. From FIG. 2, we can relate the screen position $\alpha$ to the identical height $y_A$ according to the relation $$\alpha = \phi_1 + 2(\phi_3 - \phi_1) \tag{10}$$

where $$\phi_1 = \arcsin(y_A/R_1) \tag{11}$$

and $$\phi_3 = \arcsin(y/R_3) \tag{12}$$

which gives $$\alpha = 2 \arcsin(y/R_3) - \arcsin(y_A/R_1) \tag{13}$$

Figure 3:
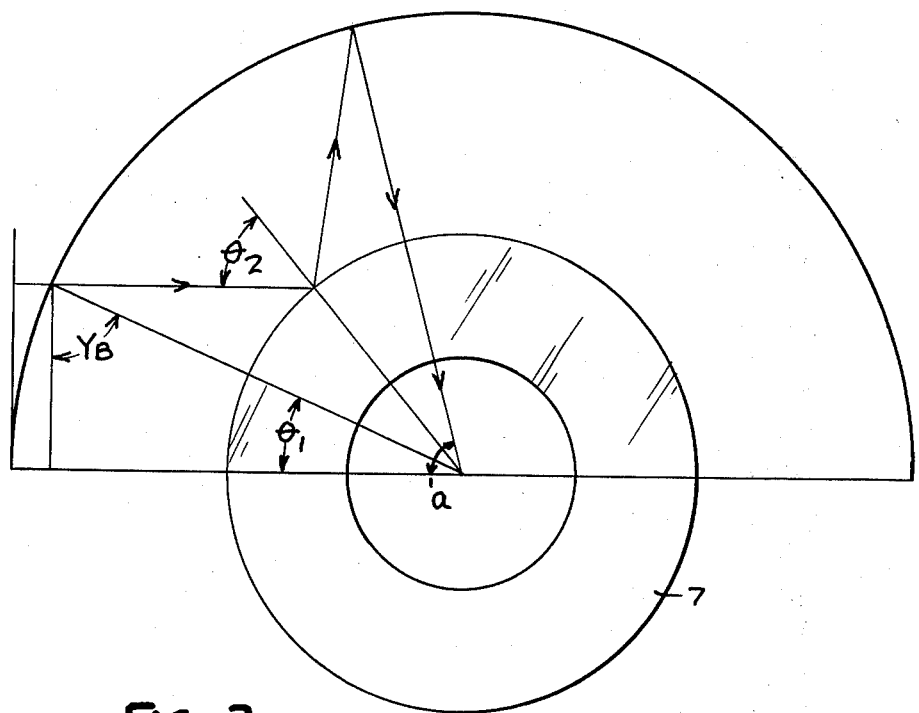
FIG. 3 is a similar view showing another portion of the rays.

It is next necessary to determine the height of ray B that also arrived at the screen at location $\alpha$. The necessary relation is seen in FIG. 3.

$$\alpha = \theta_1 + 2(\theta_2 - \theta_1) \tag{14}$$

$$\alpha = 2\theta_2 - \theta_1 \tag{15}$$

where $$\theta_1 = \arcsin(y_B/R_1) \tag{16}$$

and $$\theta_2 = \arcsin(y_B/R_2) \tag{17}$$

Equation (13) gives $\alpha$ as a function of $Y_A$, which we express as $$\alpha = \alpha(y_A) \tag{18}$$

Equation (15) then gives $$\alpha(y_A) = 2 \arcsin(y_B/R_2) - \arcsin(y_B/R_1) \tag{19}$$

Unfortunately, Equation (19) is transcendental, which yields no easy analytical expression for $y_B$ in terms of $y_A$. Nevertheless, we can make use of the fact that the last term of Equation (19) is small and proceed to evaluate $y_B$ by means of a simple numerical iteration procedure. We rewrite Equation (15)

$$\theta_2 = (\alpha + \theta_1)/2 \tag{20}$$

$$\sin \theta_2 = \sin(0.5\alpha + 0.5\theta_1) \tag{21}$$

so that, from Equation (17)

$$y_B = R_2 \sin[0.5\alpha + 0.5 \arcsin(y_B/R_1)] \tag{22}$$

Since the second term in the brackets on the right hand side of Equation (22) is small compared to the first term, a first approximation for $y_B$ is $$y_B = R_2 \sin(0.5\alpha) \tag{23}$$

This value of $y_B$ is used in the second term in the brackets in Equation (22) which gives an improved value for $y_B$. The new $y_B$ on the left side may be used on the right side of Equation (22) for an even better value. The iteration may be repeated until $y_B$ no longer changes by an amount of the accuracy desired.

We now need to write the optical path difference for the rays at the screen position $\alpha$. From FIG. 2, we can write the optical path of ray A from P to the screen $$OP_A = S_1 + 2[R_1 - S_1 - R_0 + S_2 + n(y_4 + y)/\sin u] \tag{24}$$

where $$S_1 = R_1 - \sqrt{R_1^2 - y_A^2} \tag{25}$$

and all the other terms have been determined above in terms of $y_A$. In Equation (24), we have used the fact that the optical path length in the glass is the index of refraction n times the geometric path length. From FIG. 3, we write the optical path for ray B from P to the screen at $\alpha$ $$OP_B = S + 2(R_1 - S - R_2 + S') \tag{26}$$

where $$S = R_1 - \sqrt{R_1^2 - y_B^2} \tag{27}$$

and $$S' = R_2 - \sqrt{R_2^2 - y_B^2} \tag{28}$$

The optical path difference OPD is the difference of $OP_A$ and $OP_B$ and is now given as a function of $y_A$. Since there is a $\pi$ phase change upon reflection of ray B, the condition for a dark fringe at $\alpha$ is that the OPD be a multiple of $\lambda$.

$$OPD = OP_A - OP_B = m\lambda \tag{29}$$

We can now increment $y_A$ very finely (on the computer) over the beam width and evaluate the OPD at each $y_A$. Each resulting OPD is then checked to see if it is a multiple of the wavelength $\lambda$ (to within some desired accuracy). If Equation (29) is satisfied, the screen position $\alpha$ and $m$, the number of waves in the OPD, is printed out.

A computer program for the above scheme was written and executed using the following tube and screen sizes: $R_1 = 2000$mm, $R_2 = 5$mm, $R_3 = 4$mm, $\lambda = 0.00063282$mm, and the index $n$ was chosen to be 1.52. The output showed hundreds of fringes. The fringe spacing on the screen is given by multiplying the difference in $\alpha$ for adjacent fringes by $R_1$. The fringe spacing as a function of screen position $\alpha$ is plotted in FIG. 4.

An experimental verification of the above results was made. A tube closely matching the one for the results of FIG. 4 gave agreement with the above theory. Increasing the size of the tube and the wall thickness decreases the fringe spacing.

Figure 4:
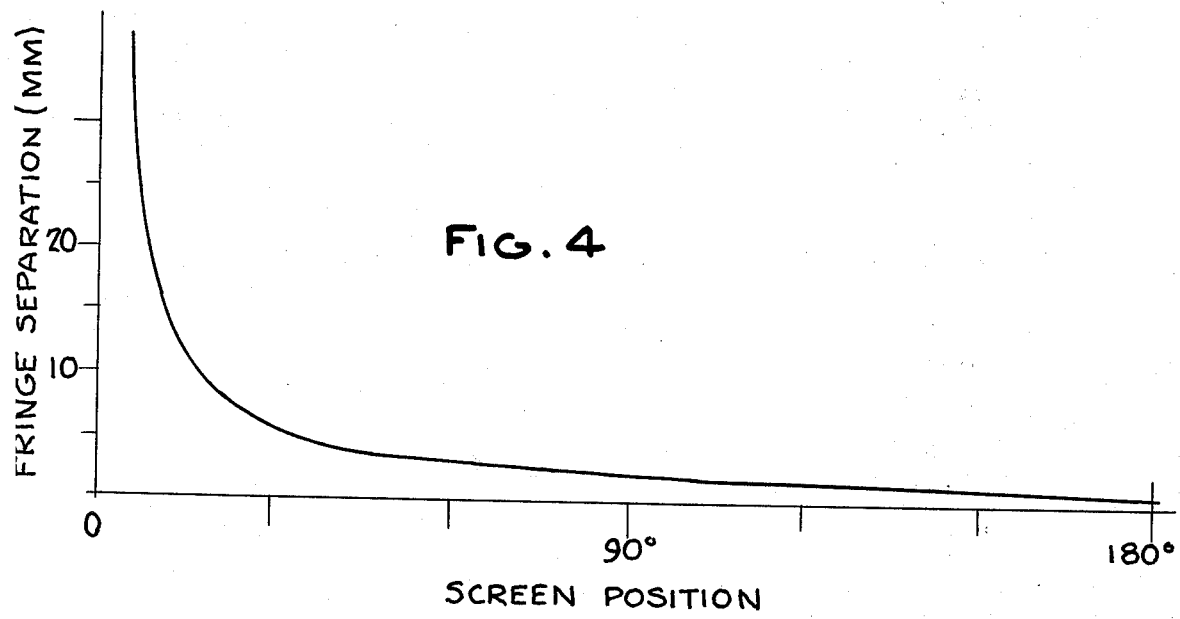
FIG. 4 is a graph of fringe separation versus screen position.

Notice the increase in fringe spacing in FIG. 4 as the angle $\alpha$ becomes small. This was also observed experimentally but is in disagreement with the reported observations of Brown and Rome.

In addition, photographs were taken of the laser fringes from 13 samples of tubing of various sizes. Using the labeled data on each tube (except for a few which had to be measured) the computer program predicted what the fringe spacing should be. The photos were taken at 90° to the incident laser beam and at 1000mm from the tube. The fringes were then roughly measured from the photographs and compared with the predicted values. Much of the discrepancy is due to the fact that the labeled data on the tubes is inaccurate. Also, greater care could be taken to measure the O.D. and the I.D. of the tubes and the fringe spacing on the photograph.

Nevertheless, the results as shown in Table I do indicate the validity of the explanation of the cause of the fringes.

TABLE I

COMPARISON OF GLASS TUBING FRINGES
FRINGE SPACING

| No. | O.D. | Wall | Calculated | Observed | Difference |
|---|---|---|---|---|---|
| 1 | 31.5 | 1.35 | 1.175 | 1.238 | −5.4% |
| 2 | 29.05 | 1.35 | 1.170 | 1.041 | 11.0% |

TABLE I-continued

COMPARISON OF GLASS TUBING FRINGES
FRINGE SPACING

| No. | O.D. | Wall | Calculated | Observed | Difference |
|-----|------|------|------------|----------|------------|
| 3   | 24.8666 | 1.52399 | 1.015 | 0.888 | 12.5% |
| 4   | 25.00 | 1.45 | 1.072 | 1.232 | 14.9% |
| 5   | 21.38 | 2.2605 | 0.645 | 0.612 | 5.1% |
| 6   | 16.25 | 0.80 | 1.973 | 2.040 | −3.4% |
| 7   | 16.25 | 1.05 | 1.470 | 1.571 | −6.9% |
| 8   | 15.8496 | 1.143 | 1.336 | 1.351 | −1.1% |
| 9   | 13.97 | 1.524 | 0.950 | 0.909 | 4.3% |
| 10  | 7.00 | 1.1 | 1.232 | 1.269 | −3.0% |
| 11  | 5.8674 | 1.0153 | 1.306 | 1.178 | 9.8% |
| 12  | 6.25 | 0.69 | 2.099 | 2.057 | 2.0% |
| 13  | 6.25 | 0.55 | 2.719 | 2.560 | 5.8% |

Small changes of the size and index of the largest tube were made on the computer (Table II). The resulting fringe spacing differences are a measure of the sensitivity of this concept to measure changes in wall thicknesses. Notice that the detector distance of 1000mm must be held to closer than 10mm since this change produced a fringe spacing change that was greater than that produced by a wall change of 0.01mm. An index change from 1.52 to 1.51 or 1.53 also produced a fringe spacing change equal to a wall change of 0.01mm. To obtain 0.01mm wall accuracies, the index must remain uniform to 0.01 at least. To obtain absolute wall measurements, it is necessary to know the index preferably to three decimal places, but at least to one part in the second decimal place. However, the system could be calibrated without knowing the index of any particular tubing by accurately measuring the wall on a piece of sample tubing.

TABLE II

COMPUTER TOLERANCE ANALYSIS

| Units = mm | $R_1$ (Screen Dist.) | $R_2$ (Outer Radius) | $R_3$ (Inner Radius) | N (Index) | Wall | Fringe (Separation at 90°) |
|---|---|---|---|---|---|---|
| Nominal | 1000. | 15.75 | 14.40 | 1.52 | 1.35 | 1.17597 |
|   | 1010. |   |   |   | 1.35 | $\Delta F =$ .01222 |
|   | ($\Delta R_1 = 10.$) |   |   |   |   |   |
|   |   | $\Delta R_2 = .01$ |   |   | 1.36 | $\Delta F = -.009067$ |
|   |   |   | $\Delta R_3 = .01$ |   | 1.34 | $\Delta F =$ .009562 |
|   |   |   |   | $\Delta N = -.01$ | 1.35 | $\Delta F = -.009694$ |
|   | $\Delta R_1 = -10.$ |   |   |   | 1.35 | $\Delta F = -.011309$ |
|   |   | $\Delta R_2 = -.01$ |   |   | 1.34 | $\Delta F =$ .009088 |
|   |   |   | $\Delta R_3 = -.01$ |   | 1.36 | $\Delta F = -.009247$ |
|   |   |   |   | $\Delta N = 0.1$ | 1.35 | $\Delta F =$ .009206 |

It is known that the fringe spacing slowly changes as the aberration angle changes from 90°. In another computer run, the nominal case was investigated at slightly different detector angles. As the detecting angle changed from 90.0° to 89.4°, the fringe spacing changed by only 0.00124mm which is well within the tolerance required to detect 0.01mm wall changes. This change in detecting angle is equivalent to a tube motion of 10.6mm. This means that tube motions in the direction of the incident laser beam of ± 20.0mm are acceptable. Tube motion perpendicular to this, as noted above (corresponding to changes in screen or detector distance), must be held to something less than ± 5.0mm for a detector distance of 1000mm.

Another very interesting feature is observed by plotting the fringe spacing of all the various tubes tested as a function of wall thickness. This was done in FIG. 5. Notice that there is a very consistent trend (nearly linear) of fringe spacing as a function of wall thickness, independent of the outside diameter of the tube. As marked on FIG. 5, the two tubes with a 1.52mm wall differed by almost a factor of 2 in their outside diameter, yet their fringe separation differed by only 0.06mm. This means that any changes in the fringe spacing observed on any one tube on-line will be due directly to a change in wall thickness alone. This is a good feature since it means that separate calibrations of fringe spacing versus wall thickness are not necessary for a wide variation in tube size. Thus, independent measurement of the tube O.D. and two fringe measurements (on opposite sides of the tube) will give good absolute determinations of tube inner diameters.

Various methods can be used to measure the fringe spacing. One method is to use a simple photo detector which is several fringes incident on its face and rotate past the detector grating that has a spacing that slowly increases. When the grating spacing is much less than the fringe spacing, the detector output will be fairly uniform at ½ the intensity it would have without the grating. Now as the grating spacing approaches that of the fringes, the output will periodically vary about this ½ intensity level with an increasing amplitude. When they exactly match, the maximum will be the same as without the grating and the minimum will be zero. Correlating when this occurs with the calibrated grating electronically will give the fringe spacing.

An apparatus for performing the method is shown in FIG. 6 and comprises a laser 10, the beam of which is directed by a mirror 11 against the wall of a glass tube T producing interference fringes at a point F in space. The interference fringes are scanned by a rotating mirror 12 driven by a motor 13. The mirror directs an image to lens 14 and, in turn, to a detector 15. The detector 15 thus sequentially passes across the fringe pattern. The resultant output signal after conditioning by an amplifier and squaring circuit 17 and signal conditioner and clipper 18 is compared in a detector 19 to a clock pulser 20 and the time interval for one or ten pulses is used to compute the fringe spacing set in a display 21 or to a reject mechanism 22. Initial calibration with the known diameter could be used to establish operation. The detector 15 may be a solid state detector or an image detector-photo multiplier tube.

Figure 7:
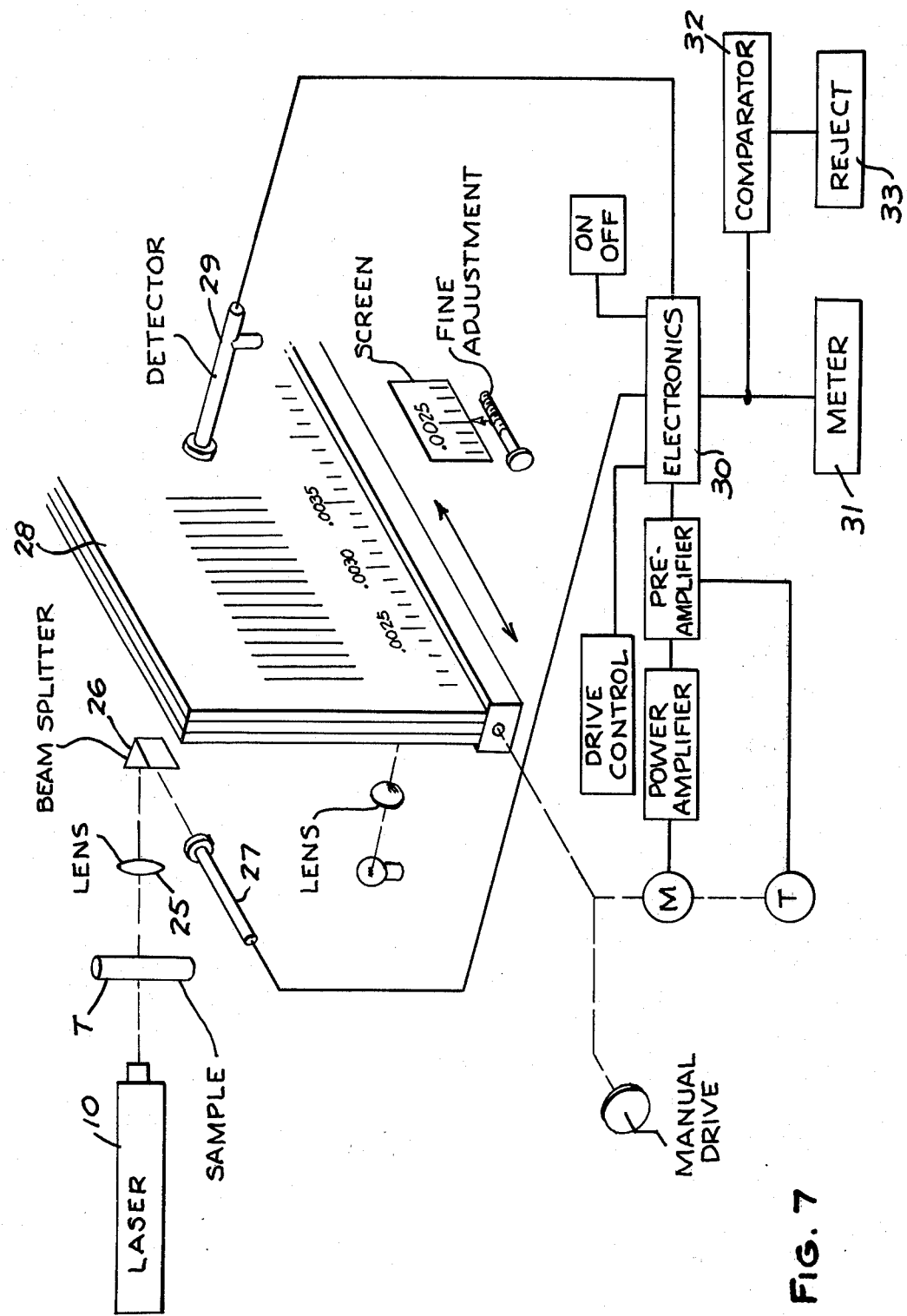
FIG. 7 is a schematic diagram of a modified form of the apparatus.

In a modified form of the apparatus shown in FIG. 7, the moving "Moire pattern" is utilized. The coherent beam from laser 10 is reflected from the two surfaces of tube T producing an image of the interference fringes that is directed by lens 25 to a beamsplitter 26. The beamsplitter divides the beam into one portion toward detector 27 and another portion through the Moire pattern 28 to a detector 29. The Moire pattern has a variable frequency pattern and movement between the pattern being analyzed and the Moire pattern changes the frequency of the modulated light. This provides a spatial frequency correlation wherein the correlation peak is detected by suitable electronics 30 to determine an actual value on a meter 31 or compared with a compactor at 32 to actuate a reject mechanism 33.

I have further determined that when additional beams of coherent light are directed at circumferentially spaced points along the periphery of the glass tube to create corresponding interference fringe areas, when the spacing between the fringes differs, it is an indication of lack of concentricity between the inner and outer surfaces of the glass article.

The method of measuring wall thickness and concentricity can be applied to stationary articles such as containers or moving articles such as lengths of tubing. If only thickness is to be measured, then the articles can be rotated to measure the thickness at various portions of the periphery.

I claim:

1. The method of measuring wall thickness of a tubular glass article which comprises
    directing a beam of coherent light against the outer surface of the article at an angle such as to cause reflection of a single ray of the beam from the outer surface and refraction of another transversely spaced single ray of the beam by the outer surface to the inner surface and reflection from the inner surface and refraction out of the outer surface,
    permitting the two reflected rays to pass outwardly from the article to a distance such as the two rays only converge and form interference fringes,
    and comparing the spacing between said interference fringes with a predetermined standard.

2. The method set forth in claim 1 including the step of creating a reject signal when the fringe spacing deviates from the predetermined standard by a predetermined amount.

3. The method set forth in claim 1 including the step of directing additional beams of coherent light against circumferentially spaced points such that the transversely spaced rays of the additional beams are reflected from the outer and inner surfaces of the tubular article, respectively,
    and comparing the interference fringe spacing of interference fringes formed by said rays of each said beam to one another such that said comparison determines variations in wall thickness and eccentricity between the outer and inner surfaces.

4. The method set forth in claim 3 including the step of creating a signal when the interference fringes from the several beams deviate by a predetermined standard indicating that permissible eccentricity has been exceeded.

* * * * *

UNITED STATES PATENT AND TRADEMARK OFFICE
CERTIFICATE OF CORRECTION

PATENT NO. : 3,994,599
DATED : Nov. 30, 1976
INVENTOR(S) : William H. Southwell

It is certified that error appears in the above–identified patent and that said Letters Patent are hereby corrected as shown below:

Col. 3, line 60, should read as follows:

$$OP_A = S_1 + 2[R_1 - S_1 - R_2 + S_2 + n(Y_A - Y)/\sin u] \qquad (24)$$

Signed and Sealed this

Twenty-sixth Day of April 1977

[SEAL]

Attest:

RUTH C. MASON
*Attesting Officer*

C. MARSHALL DANN
*Commissioner of Patents and Trademarks*